Aug. 20, 1963 G. E. FRANCK 3,101,206
ROTATIONALLY ADJUSTABLE FITTING WITH EXTRUSION RESISTING SEAL
Filed Sept. 11, 1959
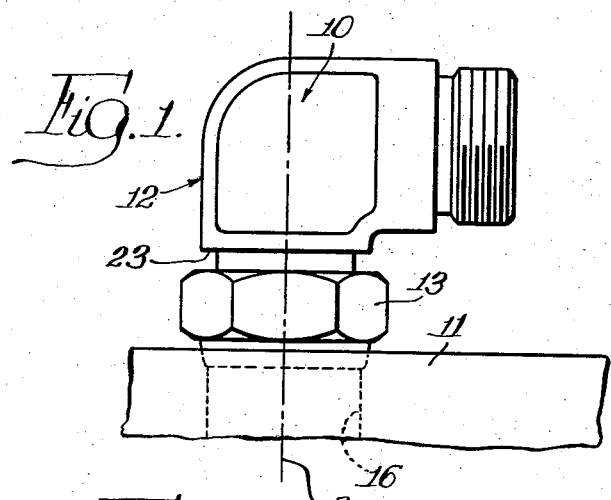
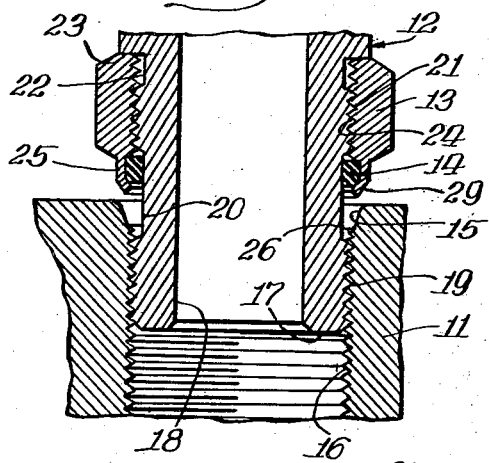
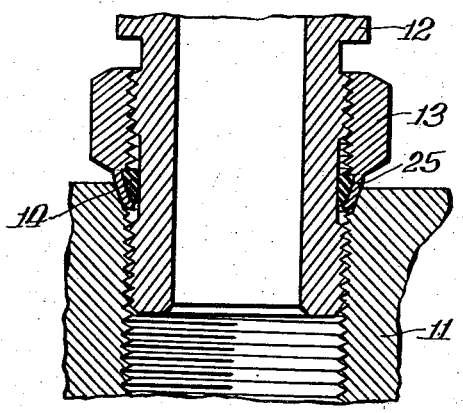
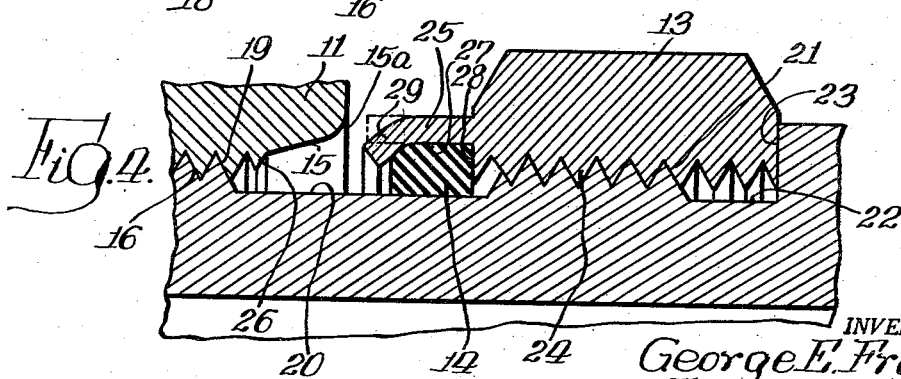
INVENTOR.
George E. Franck

United States Patent Office 3,101,206
Patented Aug. 20, 1963

3,101,206
ROTATIONALLY ADJUSTABLE FITTING WITH
EXTRUSION RESISTING SEAL
George E. Franck, Riverside, Ill., assignor to Imperial-Eastman Corporation, a corporation of Illinois
Filed Sept. 11, 1959, Ser. No. 839,436
5 Claims. (Cl. 285—220)

This invention relates to fittings and in particular to fittings, such as elbows, requiring a sealing connection of the fitting to means defining a port with the fitting in any one of a plurality of rotational positions relative to the axis of the port.

Elbow fittings provided for such use in industrial hydraulic applications have had the serious disadvantage of inability to maintain a tight connection with the increased pressures now in use. Such fittings have relied on the sealing engagement of co-operating threads and have proven completely unsatisfactory, as the over torquing necessary to obtain the desired angular relationship in the tightened condition has frequently resulted in broken and deformed fittings. Further, because of the difficulty of maintaining the necessary close tolerances in such pipe threads, leakage through the spiral thread passage has been a serious problem.

The principal object of the instant invention, therefore, is to provide a fitting having new and improved sealing means arranged for sealing connection of the fitting to means defining a port with the fitting in any one of a plurality of rotational positions relative to the axis of the port.

Another object of the invention is to provide such a fitting arranged for improved co-operation with conventional port defining means.

Another object is to provide such a fitting having effectively minimized projection from the port defining means when connected thereto.

A further object of the invention is to provide such a fitting having a body, a nut, a deformable sealing ring constrictibly sealing the nut to the body, and a deformable portion on the nut sealing the nut to the port defining means.

Another object is to provide such a fitting arranged to have tight sealed connection to a conventional port defining means notwithstanding tolerance variations, minor deformities, or machining irregularities in the port defining means and fitting elements.

Still another object of the invention is to provide such a fitting arranged to indicate automatically a preselected association of the fitting with the port defining means.

A still further object of the invention is to provide such a fitting including a shoulder on the body co-operating with the nut to effect such automatic indication and to arrange the nut on the body to dispose the associated deformable sealing ring in a preselected position precluding undesirable deformation thereof.

A yet further object is to provide such a fitting wherein the portion of the nut engaging the port defining means is arranged to retain the sealing ring in association with the nut.

Yet another object is to provide such a fitting adapted to be remade a substantial number of times while retaining the desirable sealing characteristics thereof.

Other features and advantages of the invention will be apparent from the following description taken in connection with the accompanying drawing wherein:

FIG. 1 is a fragmentary elevation of a fitting embodying the invention, connected to a port defining means;

FIG. 2 is an enlarged, fragmentary diametric section thereof with the elements of the fitting arranged as preparatory to making up the connection;

FIG. 3 is a diametric section similar to that of FIG. 2, but with the connection made up; and FIG. 4 is a further enlarged, fragmentary section illustrating a portion of the fitting as seen in FIG. 2.

In the exemplary embodiment of the invention as disclosed in the drawing, a fitting generally designated 10 arranged for connection to a port defining means 11, comprises a tubular elbow member 12, a nut 13 threadedly secured to elbow member 12, and a sealing ring 14. In connecting fitting 10 to port 11, the elbow member 12 is threadedly secured to the port means and adjusted to a desired rotational position relative to the axis A of the port, as illustrated in FIG. 1. Nut 13 is then tightened while the elbow is retained in the desired position. The resultant seal between the elbow and the port means effected by nut 13 and sealing ring 14 is positive and capable of withstanding extremely high pressures and temperatures indefinitely.

Referring now more specifically to FIGS. 2, 3 and 4, port means 11 is shown to comprise an S.A.E. standard boss provided with an outwardly widening, frusto-conical cam surface 15 and a threaded bore 16 opening into cam surface 15. Cam surface 15 extends at an angle of approximately 12° for use with tubes up to 3/8" O.D. and 15° for use with larger O.D. tubes. Bore 16 may be provided with any suitable type thread, including a machine or straight thread, the conventional thread comprising a straight thread illustratively ranging from a 5/16–24 characteristic for use with a 1/8" O.D. tube to a 2 1/2–12 characteristic for use with a 2" O.D. tube.

Elbow 12 comprises a tubular element having an inner end 17 and a bore 18 extending through the elbow and opening through inner end 17 to communicate with port means bore 16. Extending outwardly from the inner end 17 of the elbow is an exteriorly threaded inner portion 19 adapted to be threadedly secured to port means bore 16. An exteriorly cylindrical intermediate portion 20 of the elbow extends coaxially outwardly from inner portion 19 and has an outer diameter no greater than, and preferably substantially equal to, the root diameter of the threaded inner portion 19. Extending successively coaxially outwardly from the intermediate portion are an exteriorly threaded portion 21 threaded similarly to inner portion 19 and an outer exteriorly cylindrical portion 22 diametrically similar to portion 20. The outer end of portion 22 is defined by a radial shoulder 23.

The minimum number of threads of threaded portion 19 is determined by subtracting from the preselected minimum length (i.e., at the low tolerance limit) of the elbow between shoulder 23 and inner end 17, the preselected maximum length (i.e., at the high tolerance limit) of the elbow between shoulder 23 and the inner end of portion 20 (i.e., adjacent portion 19) and dividing by the pitch of the threads of portion 19 (i.e., the pitch of the threads of port means bore 16); illustratively, this number may vary from 4.00 for 1/4" tubes to 5.28 for 1" tubes. The number of the effective threads of portion 21 is determined by subtracting the preselected maximum length of portion 22 (i.e., at the high tolerance limit) from the minimum length of the elbow between shoulder 23 and the inner end of threaded portion 21 (i.e., adjacent portion 20) and dividing by the pitch of the threads; illustratively, this number may be approximately 3.28 to 3.41.

Nut 13 is provided with an interiorly threaded outer portion 24 threadedly secured to threaded portion 21 of the elbow. An inner annular deformable portion 25 extends coaxially inwardly from outer portion 24 and concentrically circumjacent intermediate elbow cylindrical portion 20. Deformable portion 25 deflectably engages cam surface 15 of the port means 11 whereby, when the nut 13 is advanced into port 16, deformable portion 25 is deflected inwardly along the frusto-conical cam surface 15 and the outer end 26 of the thread of bore 16 to adjacent cylindrical surface 20 of the elbow. As best seen in FIG. 4, the longitudinal extent of nut portion 24 is substantially equal to the total longitudinal extent of threaded portion 21 and cylindrical portion 22 of the elbow, and preferably .005" to .015" longer than said portions as determined when the over-all length of the nut is maximum (i.e., at the high tolerance limit) and the length of the deformable portion is minimum (i.e., at the low tolerance limit). The outer diameter of deformable portion 25 is preferably slightly larger than the original diameter of the outer end of surface 15 (i.e., prior to the breaking thereof) to provide a relatively high interference, illustratively ranging from .0185"±.0045" for ¼" tubes to .0275"±.0045" for 1" tubes. The undeflected inner diameter of the deformable portion 25 is substantially greater than the outer diameter of cylindrical portion 20, whereby an annular space 27 is defined therebetween.

Sealing ring 14 preferably comprises a split ring formed of a corrosion resistant sealing material capable of resisting extrusion to between threads 21 and 24 under high pressures such as 20,000 to 30,000 p.s.i., e.g., nylon (polymerized polyamide resin) or glass fiber filled nylon. Where the fitting is to be used at high temperatures, ring 14 is preferably formed of a thermosetting plastic, such as asbestos filled phenolic resin. The longitudinal extent of ring 14 is preferably slightly less than the undeformed longitudinal extent of nut deformable portion 25, e.g., ranging from .034"±.008" for a ¼" tube to .044"±.008" for a 1" tube. Ring 14 is installed in space 27 in longitudinally outward abutment with a radial shoulder 28 of nut 13 at the outer end of deformable portion 25 permitting the inner end 29 of the deformable portion to be disposed inwardly of the ring at all times to preclude pinching of the ring by the end 29 of the deformable portion 25. As seen in FIG. 4, end 29 is crimped inwardly from its original undeformed arrangement (shown in dotted lines) to retain the ring 14 in space 27 and provide an initial constrictive deformation of the deformable portion. The outer diameter of ring 14 is preferably only slightly smaller (e.g., ranging from approximately .0035" for a ¼" tube to approximately .004" for a 1" tube) than the inner diameter of the undeformed portion 25 and the internal diameter of ring 14 is preferably slightly greater (e.g., ranging from approximately .004" for a ¼" tube to .005" for a 1" tube) than the outer diameter of elbow cylindrical surface 20 to facilitate installation while yet assuring the substantial filling of space 27 by the ring when portion 25 is constrictively deformed. The length of cylindrical portion 20 is determined by multiplying the length of nut deformable portion 25 by 1⅓ and adding 1.5 times the pitch of the nut thread and the insert assembly clearance; illustratively, the length of portion 20 ranges from approximately .243" for a ¼" tube to .395" for a 1" tube.

The connection of fitting 10 to port means 11 is effected as follows. The fitting is provided in an assembled condition wherein the nut 13 is threaded onto elbow portion 21 and sealing ring 14 is installed in space 27. The end 29 of nut deformable portion 25 is crimped inwardly to retain the sealing ring 14 in association with the nut and elbow and, thus, prevent dissociation of the nut from the elbow. Nut 13 is disposed in abutment with elbow shoulder 23. (The fitting is normally provided by the manufacturer with the nut in this disposition.) As the crimping of end 29 effects some constriction of sealing ring 14, the ring is relatively tight on the elbow portion 20 retaining the nut in abutment with shoulder 23.

With the nut thus positioned on the elbow, the elbow portion 19 is threaded into port bore 16 until crimped end portion 29 engages the rounded outer end 15a of the cam surface 15. This automatically positions elbow portion 19 in the port bore 16 at substantially the desired fully threaded position. The elbow is then reversely rotated to the desired rotational position thereof relative to the axis A of the port bore. The elbow may be reversely threaded up to one full turn about axis A in so positioning it and, resultingly, the crimped end 29 may be spaced outwardly from rounded surface portion 15a up to one full pitch of the thread of port bore 16.

The nut is then advanced on elbow threaded portion 21 away from shoulder 23 to re-engage crimped end 29 of nut portion 25 with the rounded surface portion 15a of the port means, while holding the elbow in the selected rotational position. Rotation of the nut is continued with the elbow so held, thereby forcing the deformable portion 25 inwardly by the engagement thereof with frusto-conical surface 15 of the port means and, at the inner end thereof, the outer end 26 of the port bore thread. In thus tightening the nut 13, a substantial torque may be applied; illustratively, the torque may range from 150 to 200 inch pounds for a ¼" tube to 1,000 to 1,200 inch pounds for a 1" tube.

As seen in FIG. 3, in the tightened position, the deformable nut portion 25 is constricted inwardly by the port surface 15 and thread end 26 to dispose end 29 thereof adjacent cylindrical surface 20 whereby sealing ring 14 is substantially enclosed. This substantial enclosure of the sealing ring forces it into intimate sealing engagement with elbow surface 20 to effect a high pressure seal between the elbow and the nut. The engagement of the deformable nut portion 25 with port surface 15 provides a high pressure seal between the nut and the port means thereby completing the high pressure sealing securement of the elbow to the port means in the desired rotational position.

As deformable portion 25 of the nut is relatively readily deflectable, deformation of the port means 11 radially outwardly by the forces acting against cam surface 15 is effectively precluded, thereby eliminating this serious disadvantage as found in connectors utilizing high tensile strength, alloy metal sleeves requiring the seal to be wedged forcibly into the elbow. Further, the improved sealing means of fitting 10 permits the fitting to be remade a substantial number of times without affecting the sealing characteristics thereof. Variation in the longitudinal relationship of the port means 11 and elbow 12 is readily accommodated by nut 13 as it may be disposed on the elbow in longitudinally different positions in either direction from a previous sealing position, as required in a subsequent installation. Here again, fitting 10 offers a decided advantage over the connectors utilizing deformable metal sleeves which dig into one or more of the confronting member surfaces, as such repositioning in either of the opposite longitudinal directions can not be so effected therewith.

The improved seal effected in fitting 10 is maintained at pressures limited only by the mechanical structure of the fitting itself. The insert characteristics of the sealing ring permits use of the fitting at high temperatures and with highly corrosive fluids. As no portion of the fitting is susceptible to deterioration, there are substantially no limitations on the shelf life of the fitting and maintenance is substantially eliminated. The connection of the fitting to the port means is extremely simple and, as a result of the discussed dimensional relationships, the size of the fitting is effectively minimized while assuring proper installation in conventional port means.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A fitting for use with a conventional port means having an annular outwardly widening cam surface and a threaded bore opening into said cam surface, the fitting being adapted to be sealingly secured to the port means in any one of a plurality of rotational positions relative to the axis of the port means, said fitting comprising: a body member having an inner end, a bore extending through said body member and opening through said inner end, an exteriorly threaded inner portion adapted to be threadedly secured to said port means in the threaded bore thereof, an exteriorly cylindrical intermediate portion extending coaxially outwardly from said inner portion and having an outer diameter no greater than the root diameter of said threaded inner portion, and an outer portion extending coaxially outwardly from said intermediate portion and exteriorly threaded similar to said inner portion; a nut having an interiorly threaded outer portion threadedly secured to said outer portion of the body member, and an inner annular deformable portion extending coaxially inwardly from said outer portion of the nut and circumjacent said cylindrical intermediate portion of the body member, said deformable portion being forcibly engageable with the cam surface of the port means to effect a high pressure seal of the nut to the port means, the deformable portion being deflected inwardly by its engagement with the cam surface, the undeflected inner diameter of said deformable portion being greater than said outer diameter of the intermediate portion of the body member to define an annular space therebetween, and the longitudinal extent of said deformable portion being such that when said deformable portion is deflected inwardly by said cam surface of the port, it substantially encloses said annular space; while remaining slightly spaced therefrom and a resilient seal in said space having an uncompressed volume substantially greater than the space enclosed by said deformable portion of the nut when it is so deflected inwardly and whereby the seal provides a high pressure seal of the nut to the body member when the deformable portion is so deflected, said seal being formed of a seal material having extrusion resisting physical characteristics such as those of nylon precluding substantial extrusion thereof to between the threaded outer portions of the body and nut.

2. A fitting for use with a conventional port means having an annular outwardly widening cam surface and a threaded bore opening into said cam surface, the fitting being adapted to be sealingly secured to the port means in any one of a plurality of rotational positions relative to the axis of the port means, said fitting comprising: a body member having an inner end, a bore extending through said body member and opening through said inner end, an exteriorly threaded inner portion adapted to be threadedly secured to said port means in the threaded bore thereof, an exteriorly cylindrical intermediate portion extending coaxially outwardly from said inner portion, and an exteriorly threaded outer portion extending coaxially outwardly from said intermediate portion; a nut having an interiorly threaded outer portion threaded on said outer portion of the body member, and an inner annular deformable portion extending coaxially inwardly from said outer portion of the nut and circumjacent said cylindrical intermediate portion of the body member, said deformable portion being forcibly engageable with said cam surface of the port means to effect a high pressure seal of the nut to the port means, the deformable portion being deflectable inwardly by its engagement with the cam surface, the undeflected inner diameter of said deformable portion being greater than said outer diameter of the intermediate portion of the body member to define an annular space therebetween; and a seal in said space urged against said intermediate portion of the body member by said deformable portion of the nut when it is so deflected inwardly to provide a high pressure seal of the nut to the body member when the deformable portion is so deflected, said seal being formed of a seal material having extrusion resisting physical characteristics such as those of nylon precluding substantial extrusion thereof to between said threaded outer portion of the body member and said threaded outer portion of the nut.

3. A fitting for use with a conventional port means having an annular outwardly widening cam surface and a threaded bore opening into said cam surface, the fitting being adapted to be sealingly secured to the port means in any one of a plurality of rotational positions relative to the axis of the port means, said fitting comprising: a body member having an inner end, a bore extending through said body member and opening through said inner end, an exteriorly threaded inner portion adapted to be threadedly secured to said port means in the threaded bore thereof, an exteriorly cylindrical intermediate portion extending coaxially outwardly from said inner portion and having an outside diameter less than the tip diameter of the threaded inner portion, an outer exteriorly threaded portion extending coaxially outwardly from said intermediate portion, an outer exteriorly cylindrical portion extending coaxially outwardly from said outer exteriorly threaded portion, and a radial shoulder defining the outer end of the outer exteriorly cylindrical portion; a nut having an interiorly threaded outer portion threadedly secured to said outer exteriorly threaded portion of the body member and circumjacently overlying said outer exteriorly cylindrical portion of the body member to abut said radial shoulder in a retracted position prior to securing of the fitting to the port means, and an inner annular deformable portion extending coaxially inwardly from said outer portion of the nut and circumjacent said cylindrical intermediate portion of the body member, said deformable portion being forcibly engageable with said cam surface of the port means to effect a high pressure seal of the nut to the port means, the deformable portion being deflected inwardly by its engagement with the cam surface, the axial length of the nut being correlated with the spacing of the radial shoulder of the body member from the inner exteriorly threaded portion thereof to juxtapose the deformable portion to the port means and automatically position the inner portion of the body member in a preselected position in the port means, the undeflected inner diameter of said deformable portion being greater than said outer diameter of the intermediate portion of the body member to define an annular space therebetween and the longitudinal extent of said deformable portion being such that when said deformable portion is deflected inwardly by said cam surface of the port, it substantially encloses said annular space; and a split ring seal coaxially in said space, said seal ring having an uncompressed volume substantially greater than the space enclosed by said deformable portion of the nut when it is so deflected inwardly and whereby the seal provides a high pressure seal of the nut to the body member when said deformable portion is so deflected, said ring seal being formed of a seal material having extrusion resisting physical characteristics such as those of nylon precluding substantial extrusion thereof to between the threaded outer portions of the body and nut.

4. A fitting for use with a conventional port means having an annular outwardly widening cam surface and a threaded bore opening into said cam surface, the fitting being adapted to be sealingly secured to the port means in any one of a plurality of rotational positions relative to the axis of the port means, said fitting comprising: a body member having an inner end, a bore extending through said body member and opening through said inner end, an exteriorly threaded inner portion adapted to be threadedly secured to said port means in the threaded bore thereof, a coaxial, exteriorly threaded outer portion, and a cylindrical portion coaxially between said threaded portions and having an outer diameter less than the tip diameter of the threaded inner portion; an annular nut having an interiorly threaded outer portion threadedly secured to said outer threaded portion and having an inner deformable end portion defining a radially inwardly opening annular space confronting said cylindrical portion of the body member; and a split seal ring coaxially in said space, said ring being formed of a seal material having extrusion resisting physical characteristics such as those of nylon precluding substantial extrusion thereof to between the threaded outer portions of the body and nut.

5. The fitting of claim 4 wherein the nut includes a radial shoulder at the outer end of the annular space extending to substantially adjacent the body member for retaining the seal against longitudinally outward deformation.

References Cited in the file of this patent

UNITED STATES PATENTS

| | | |
|---|---|---|
| 1,217,965 | Lloyd | Mar. 6, 1917 |
| 1,983,840 | Dohner | Dec. 11, 1934 |
| 2,413,878 | Maky | Jan. 7, 1947 |
| 2,588,372 | Erb | Mar. 11, 1952 |
| 2,704,676 | Harding | Mar. 22, 1955 |
| 2,826,438 | Woodling | Mar. 11, 1958 |
| 3,003,795 | Lyon | Oct. 10, 1961 |